United States Patent [19]

Misage et al.

[11] Patent Number: 4,824,738

[45] Date of Patent: Apr. 25, 1989

[54] CONTROLLING OXYGEN CONCENTRATIONS IN FUEL CELL COOLING WATER LOOPS

[75] Inventors: Robert J. Misage, Manchester; Daniel L. D'Aquila, South Windsor; Albert P. Grasso, Vernon, all of Conn.

[73] Assignee: International Fuel Cells Corporation, South Windsor, Conn.

[21] Appl. No.: 157,541

[22] Filed: Feb. 12, 1988

[51] Int. Cl.$^4$ .................. H01M 8/04; H01M 2/32
[52] U.S. Cl. ........................... 429/12; 429/26
[58] Field of Search ......................... 429/13, 26

[56] References Cited

U.S. PATENT DOCUMENTS 3,923,546 12/1975 Katz et al. .................. 429/26
3,969,145 7/1976 Grevstad et al. .............. 429/26
4,670,357 6/1987 Taylor ........................ 429/26

Primary Examiner—Donald L. Walton
Attorney, Agent, or Firm—William W. Jones

[57] ABSTRACT

In order to achieve good stack water chemistry and minimize corrosion in a fuel cell stack water cooling loop, the oxygen concentration in the water must remain within a relatively narrow range. Stacks using steam separators produce water in the separators which is relatively devoid of oxygen. Makeup water is used to replace the steam lost from the separator, which makeup water is relatively rich in oxygen. The flow rates of the makeup water and steam separator water are controlled to produce a proper oxygen concentration in the recirculated coolant water. Some of the makeup water will be added directly into the steam separator so that it will be stripped of oxygen and the rest will be added subsequent to the steam separator.

10 Claims, 1 Drawing Sheet

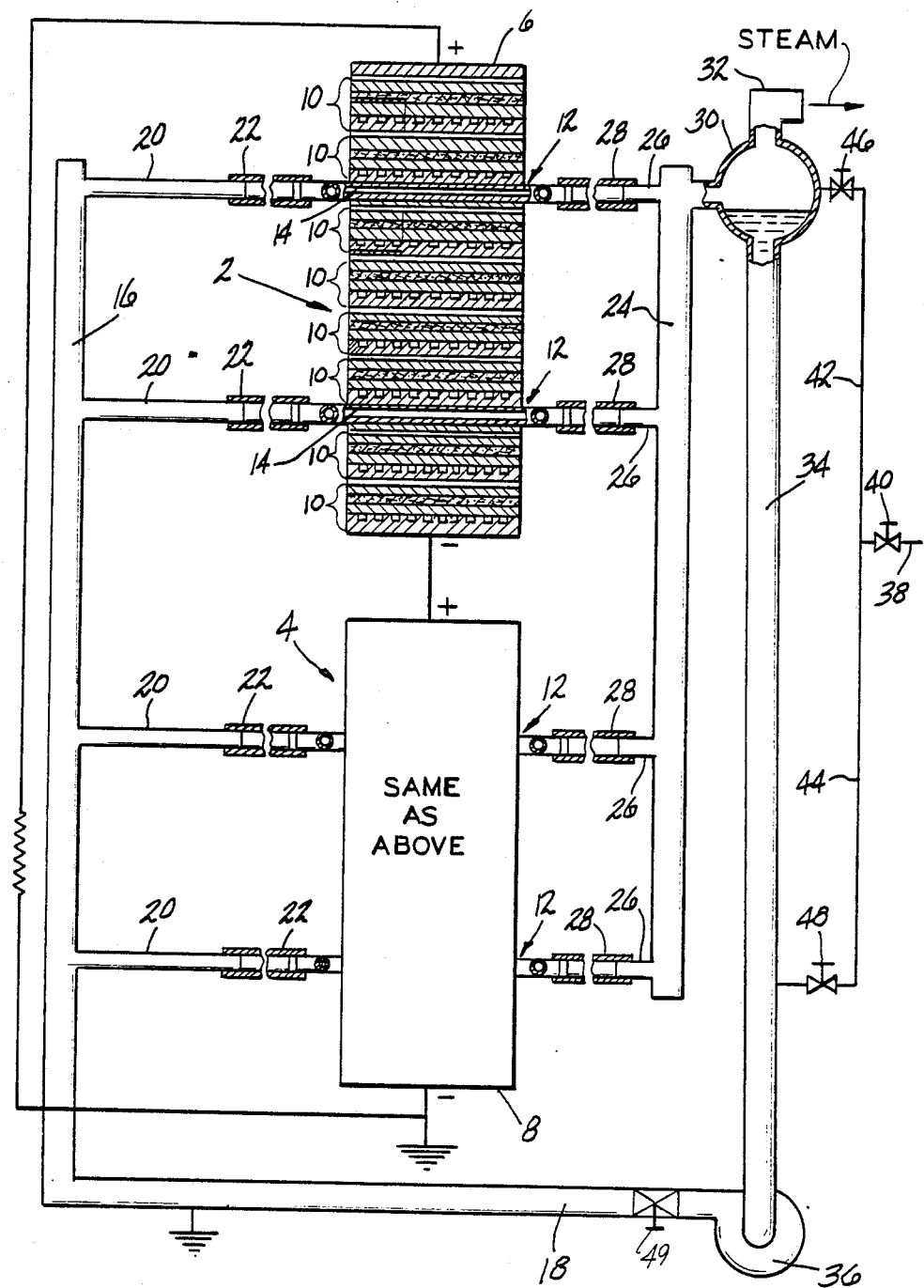

CONTROLLING OXYGEN CONCENTRATIONS IN FUEL CELL COOLING WATER LOOPS

TECHNICAL FIELD

This invention relates to water cooled fuel cell power plants, and more specifically to the control of the oxygen concentration in the water used to cool such plants.

BACKGROUND ART

The use of water circulated through a cooling loop to cool fuel cell power plants is known in the prior art. When water is used to cool fuel cell power plants, such as those using acid electrolytes, the coolant entering the power section will be water which will be heated to a two phase water-steam mixture by the time it leaves the power section. The two phase mixture will then be taken to a steam separator where the steam component will be removed from the water component. When this separation occurs, the water will be stripped of entrained oxygen so that the water leaving the steam separator will generally contain from about 0 to about 50 ppb of oxygen. In most of these systems, makeup water is added to the loop in order to replace the water which is lost in the form of steam from the steam separator. U.S. Pat. No. 3,969,145 granted July 13, 1976 to P. E. Grevstad, et al discloses a cooling system which operates in the aforesaid manner. The foregoing system does make provisions for replacing water in the loop lost as steam, but it does not ensure that the amount of oxygen in the recirculating water will be within the desired range needed to provide good water chemistry and minimize corrosion in the system.

In order to achieve the desired fuel cell power plant water chemistry and minimize corrosion, the oxygen concentration in the water entering the power section should be in the range of about 50 to 150 ppb. Since the water leaving the steam separator is substantially devoid of oxygen, the makeup water is the only source of oxygen for the coolant prior to entering the power section. The amount of oxygen in the makeup water will be approximately 7,000 ppb. The rate at which the makeup water can be added to the loop cannot be varied however, since it must be enough to replace the water lost as steam from the loop. With the prior art system shown in U.S. Pat. No. 3,969,145 it will be apparent that the amount of oxygen in the water coolant as it reenters the power section is not controllable since the amount of makeup water needed is dictated by the amount of steam lost, and is thus not variable.

DISCLOSURE OF INVENTION

Our invention relates to a system which is similar to that shown in the prior art, but wherein the amount of oxygen in the coolant water reentering the power section can be controlled and can be kept in the desired range of about 50 to about 150 ppb. In one embodiment of our invention, the coolant flow rate in the coolant loop is selected by design so as to ensure that the water entering the power section after receiving the makeup water, has an oxygen concentration in the range of about 50 to about 150 ppb.

The coolant flow rate can be selected within a broad range while still maintaining sufficient thermal cooling of the power section due to the two phase boiling water characteristics. In this embodiment, the flow rate and oxygen content of the makeup water are periodically monitored, as well as the coolant loop flow rate, and its oxygen content after addition of makeup water, and appropriate adjustments are made in the coolant flow rate to keep an oxygen concentration in the desired range when variations are noted.

In another embodiment of our invention, the makeup water entering the system is split into two branches. In the first branch, some of the makeup water is fed into the steam separator where it will be stripped of oxygen and settle into the deoxygenated water already in the steam separator. The rest of the makeup water is fed through the other branch into the return loop water line downstream of the steam separator. The amount of oxygen in the returning coolant water is thus controlled by the percentage of makeup water fed through each of the two branches. If it is desired to lower the amount of oxygen in the returning coolant, then more makeup water is fed into the steam separator, and if the opposite is true, less makeup water is fed into the steam separator. Thus the coolant loop will only receive a fraction of the total oxygen in the makeup water and that fraction can be readily varied. The latter embodiment is the preferred, of the two, embodiments of the invention.

It is, therefore, an object of this invention to provide a water cooling system for use in a fuel cell power plant having provisions for ensuring improved water chemistry for the water coolant.

It is an additional object of this invention to provide a water cooling system of the character described wherein corrosion in the water coolant is minimized.

It is another object of this invention to provide a water cooling system of the character described which operates by controlling the concentration of oxygen in the coolant water entering the power section of the plant.

It is a further object of this invention to provide a water cooling system of the character described wherein the oxygen concentration is controlled by the use of makeup water which replaces water lost from the coolant in the form of steam.

These and other objects and advantages will become more readily apparent from the following detailed description of a preferred embodiment thereof when taken in conjunction with the accompanying drawing.

BRIEF DESCRIPTION OF DRAWING

The FIGURE is a somewhat schematic representation of a fuel cell stack having a water cooling system modified in accordance with this invention.

BEST MODE FOR CARRYING OUT THE INVENTION

Referring to the drawing the power section of the plant is denoted generally by the numerals 2 and 4. The power section 2 and 4 includes top and bottom end plates 6 and 8 for tapping current from the plant, and a plurality of fuel cells 10 stacked one atop the other. The fuel cells 10 are the type that utilize an acid electrolyte, such as phosphoric acid, and operate at temperatures of about 375° F. typically. The cell stacks are provided with coolant tube assemblies, denoted generally by the numeral 12 which can comprise serpentine tubes 14, through which the water coolant flows, the tubes 14 being mounted in carbon plates. Each of the tubes 14 is connected to a coolant water inlet manifold 16 which receives water from a return conduit 18. Feeder pipes 20 extend from the inlet manifold 16 to each of the tubes 14, and are connected to the latter by dielectric sleeves 22. The water-steam mixture which leaves the coolant tubes 14 is collected in an outlet manifold 24 via pipes 26 which are connected to the tubes 14 by dielectric sleeves 28. From the outlet manifold 24, the water-steam mixture passes into a steam separator 30 where the water and steam fractions are separated from each other. The steam leaves the separator 30 through a line 32 for subsequent use in a fuel reformer. The water fraction leaves the separator through a down line 34 which leads to a pump 36 which pumps the water into the return conduit 18. As previously noted, the water exiting the separator 30 in the down line 34 is substantially devoid of oxygen. In order to replace the water lost as steam through the line 32, a makeup water feed system is included. The makeup water, which is rich in oxygen, is fed into the system from a trunk line 38 having a variable orifice valve 40, which can be modulated to increase or decrease the total amount of makeup water being added to the system, based on changes in the water level in separator 30 from the amounts of steam leaving the system. The power plant microprocessor control will control operation of the valve 40. An upper branch line 42 and a lower branch line 44 receive makeup water from the trunk line 38. The upper branch line 42 feeds makeup water directly into the steam separator 30, and the lower branch line 44 feeds makeup water into the down line 34, downstream from the separator 30. Valves 46 and 48 control the amount of water flowing through the branch lines 42 and 44 respectively. The valves 46 and 48 are periodically adjusted to achieve the desired $O_2$ level in conduit 18.

The disclosed system can operate in one of two ways. As previously noted, the objective of the system is to provide a water coolant in the return conduit 18 which has an oxygen content of between 50 and 150 ppb. The oxygen content of the water in the conduit 18 is monitored periodically. When a low oxygen condition is noted, the oxygen level in the returning coolant water can be raised in a number of ways. The pump output flow can be varied by valve 49. Thus the pump 36 can increase or decrease the rate of flow of the coolant water through the loop. If a low oxygen condition is present, the pump 36 output flow can be made to slow the flow rate of coolant through the loop. If this is done and the flow rate of makeup water through the lower branch 44 remains constant, then a greater percentage of the water in the return conduit 18 will be derived from the makeup water. Since the makeup water has a rich oxygen concentration, the oxygen content of the water in the return conduit 18 will rise. Using this approach, the valve 46 would preferably be throttled back or closed completely. Alternatively, if the oxygen content in the conduit 18 is too high the pump 36 output flow can be increased, so that the deoxygenated water in the down line will contribute more deoxygenated water to the conduit 18. This will lower the oxygen content in the return conduit 18. Thus the oxygen content of the water returning to the power section 2 and 4 can be controlled merely by increasing or decreasing the flow rate of water being recirculated while leaving the flow rate of the makeup water unchanged.

If the coolant flow rate inside of the coolant loop is desired to remain constant, the disclosed system can employ an alternative mode of operation to regulate the oxygen content in the coolant water. Altering the proportions of the makeup water which flows through each of the branch lines 42 and 44 will vary the oxygen content of the recirculating coolant water This is because the makeup water which enters the separator 30 from the line 42 is stripped of its oxygen by the steam in the separator 30, so that the only oxygen added to the recirculating coolant water will derive from the water flowing through the branch 44 Thus, if one desires to increase the oxygen content in the conduit 18, while leaving the coolant flow rate constant, the valve 46 will be throttled back to lessen the amount of makeup water entering the separator 30, and the valve 48 will be opened to increase the percentage of makeup water flowing into the down line 34 through branch 44. The total amount of makeup water entering the loop will not change, but more of it will be of the oxygen-rich variety, thereby raising the oxygen concentration in the conduit 18. The reverse procedure will be followed if one desire to lower the oxygen content in the coolant water conduit 18 without altering the coolant flow rate in the system.

It will be readily appreciated that the system of this invention can be used to retain the oxygen concentration level of the recirculating coolant water in a desired range of values so that the water chemistry of the system is optimized, and corrosion within the system is kept at a minimum. The system operates with a defined makeup water flow rate range, so that water lost to the cooling loop as steam is constantly replenished. The system can operate by varying the flow rate of the coolant water in the cooling loop, or by varying the apportionment of deoxygenated and oxygen-rich makeup water which is fed into the loop. Both approaches could also be used concurrently should conditions warrant.

Since many changes and variations of the disclosed embodiment of the invention may be made without departing from the inventive concept, it is not intended to limit the invention otherwise than as

What is claimed:

1. In a fuel cell power plant, a water coolant circulation system comprising:
   (a) cooling conduit means for circulating the water coolant in heat exchange relationship with fuel cells in a power section of the power plant;
   (b) steam separator means for separating steam from the water coolant;
   (c) first conduit means for ducting water coolant and steam from said cooling conduit means to said steam separator means;
   (d) second conduit means for ducting oxygen-depleted water from said steam separator means back to said cooling conduit means;
   (e) means for adding oxygen-rich makeup water to the oxygen-depleted water between said steam separator means and said cooling conduit means to replenish the water removed from said system as steam, and to raise the oxygen concentration in the water coolant prior to the latter entering said coolant conduit means; and
   (f) flow control means for controlling the flow of water in said system and operable to adjust the proportion of oxygen-rich makeup water mixing with the oxygen-depleted water coolant to maintain the oxygen content of water entering said coolant conduit means in a range which minimizes corrosion and optimizes water chemistry in the coolant circulation system.

2. The system of claim 1 wherein said flow control means includes means for varying the flow rate of water coolant in said system.

3. The system of claim 2 wherein said flow control means includes means for splitting the flow of makeup water whereby a first portion of the makeup water flows into said steam separator means, and a second portion of the makeup water flows into the oxygen-depleted water in said first conduit means.

4. The system of claim 3 wherein said flow control means includes variable valve means for varying the amounts of makeup water flowing to said steam separator means whereby the total percentage of the makeup water entering the system by way of said steam separator means can be changed from time to time.

5. In a fuel cell power plant, a water coolant circulation system comprising:
 (a) cooling conduits for circulating the water coolant in heat exchange relationship with fuel cells in a power section of the power plant;
 (b) a steam separator for separating steam from the water coolant;
 (c) first conduit means for ducting water coolant and steam from said cooling conduits to said steam separator;
 (d) second conduit means for ducting oxygen-depleted water from said steam separator back to said cooling conduits;
 (e) means for adding oxygen-rich makeup water to the oxygen-depleted water between said steam separator and said cooling conduits to replenish water removed from the system as steam, and to raise the oxygen concentration in the water coolant to a value in the range of about 50 to about 150 ppb; and
 (f) means for varying the flow rate of the water coolant in said system whereby increasing the water coolant flow rate while retaining the makeup water flow rate constant will lower the oxygen concentration in the water coolant, and decreasing the water coolant flow rate while retaining the makeup water flow rate constant will raise the oxygen concentration in the water coolant.

6. In a fuel cell power plant, a water coolant circulation system comprising:
 (a) cooling conduits for circulating the water coolant in heat exchange relationship with fuel cells in a power section of the power plant;
 (b) a steam separator for separating steam from the water coolant;
 (c) first conduit means for ducting water coolant and steam from said cooling conduits to said steam separator;
 (d) second conduit means for ducting oxygen-depleted water from said steam separator back to said cooling conduits; and
 (e) third conduit means for ducting oxygen-rich makeup water, said third conduit means including a first part for ducting makeup water into said steam separator, and a second part for ducting makeup water into said second conduit means.

7. The system of claim 6 further comprising means for adjusting the respective amounts of makeup water flowing through said first and second parts of said third conduit means.

8. A method for controlling the amount of oxygen in coolant water ducted into a cooling system in a fuel cell power plant, said method comprising the steps of:
 (a) providing a flowing supply of oxygen-depleted water from a steam separator in the power plant;
 (b) adding a supply of oxygen-rich makeup water to the supply of oxygen-depleted water to form a water mixture, said makeup water being added at a steady flow rate;
 (c) sensing the amount of oxygen in the water mixture; and
 (d) changing the flow rate of the oxygen-depleted water when the amount of oxygen in the water mixture is outside of the range of about 50 to about 150 ppb until the amount of oxygen in the water mixture is within the range of about 50 to about 150 ppb.

9. A method for controlling the amount of oxygen in coolant water ducted into a cooling system in a fuel cell power plant, said method comprising the steps of:
 (a) providing a steam separator for removing steam from a water-steam mixture formed in said cooling system;
 (b) withdrawing oxygen-depleted water from said steam separator for return to said power plant cooling system;
 (c) providing a supply of oxygen-rich makeup water sufficient to continuously replace water lost from the coolant water as steam;
 (d) adding a first portion of said makeup water to coolant water in said steam separator; and
 (e) adding the remainder of said supply of makeup water to said oxygen-depleted water after withdrawal thereof from said steam separator to increase the oxygen content in said oxygen-depleted water to an acceptable value whereat corrosion in the coolant water cooling system is minimized and water chemistry is optimized.

10. The method of claim 9 comprising the further steps of sensing the amount of oxygen in the coolant water mixture resulting from adding the makeup water to the oxygen-depleted water, and at such times as the sensed oxygen content is not at an acceptable value, varying the respective amounts of water added to the steam separator and to the oxygen-depleted water until the sensed oxygen content returning to said acceptable value.

* * * * *